United States Patent [19]

Flakne

[11] 3,915,081

[45] Oct. 28, 1975

[54] APPARATUS FOR TEXTURING PROTEIN

[75] Inventor: John R. Flakne, Minneapolis, Minn.

[73] Assignee: General Mills, Inc., Minneapolis, Minn.

[22] Filed: Jan. 16, 1974

[21] Appl. No.: 433,936

[52] U.S. Cl. ............................................... 99/477
[51] Int. Cl.[2] ............................................ A23J 1/14
[58] Field of Search............ 99/452, 443 C, 477 PD,
  99/453; 100/148; 137/625.21, 625.22, 486;
  222/548, 554; 251/209; 259/191, 192, 45,
  46; 426/511

[56] References Cited
UNITED STATES PATENTS

| | | | |
|---|---|---|---|
| 2,990,980 | 7/1961 | Gronemeyer | 222/554 X |
| 3,170,608 | 2/1965 | Oakes et al. | 222/548 X |
| 3,171,436 | 3/1965 | Lowell | 137/625.22 X |
| 3,400,654 | 9/1968 | Vincent | 100/148 |
| 3,468,335 | 9/1969 | Skoli et al. | 137/486 |
| 3,542,338 | 11/1970 | Scaramucci | 251/209 |
| 3,555,999 | 11/1967 | Glowacki | 100/148 |
| 3,586,036 | 6/1971 | Barnes | 137/486 |
| 3,700,006 | 10/1972 | Marcillaud | 137/625.21 |
| 3,707,380 | 12/1972 | Dunning et al. | 99/477 PD X |

FOREIGN PATENTS OR APPLICATIONS

| 24,688 | 7/1902 | Switzerland | 251/209 |
|---|---|---|---|

*Primary Examiner*—Harvey C. Hornsby
*Assistant Examiner*—Arthur O. Henderson
*Attorney, Agent, or Firm*—Norman P. Friederichs; Anthony A. Juettner

[57] ABSTRACT

Apparatus for texturing particulate protein material including an elongated treating chamber which is under pressure. The chamber has an inlet at one end and an outlet at the other end. The outlet opening is adjustably controlled in accordance with the amount of pressure in the chamber.

4 Claims, 13 Drawing Figures

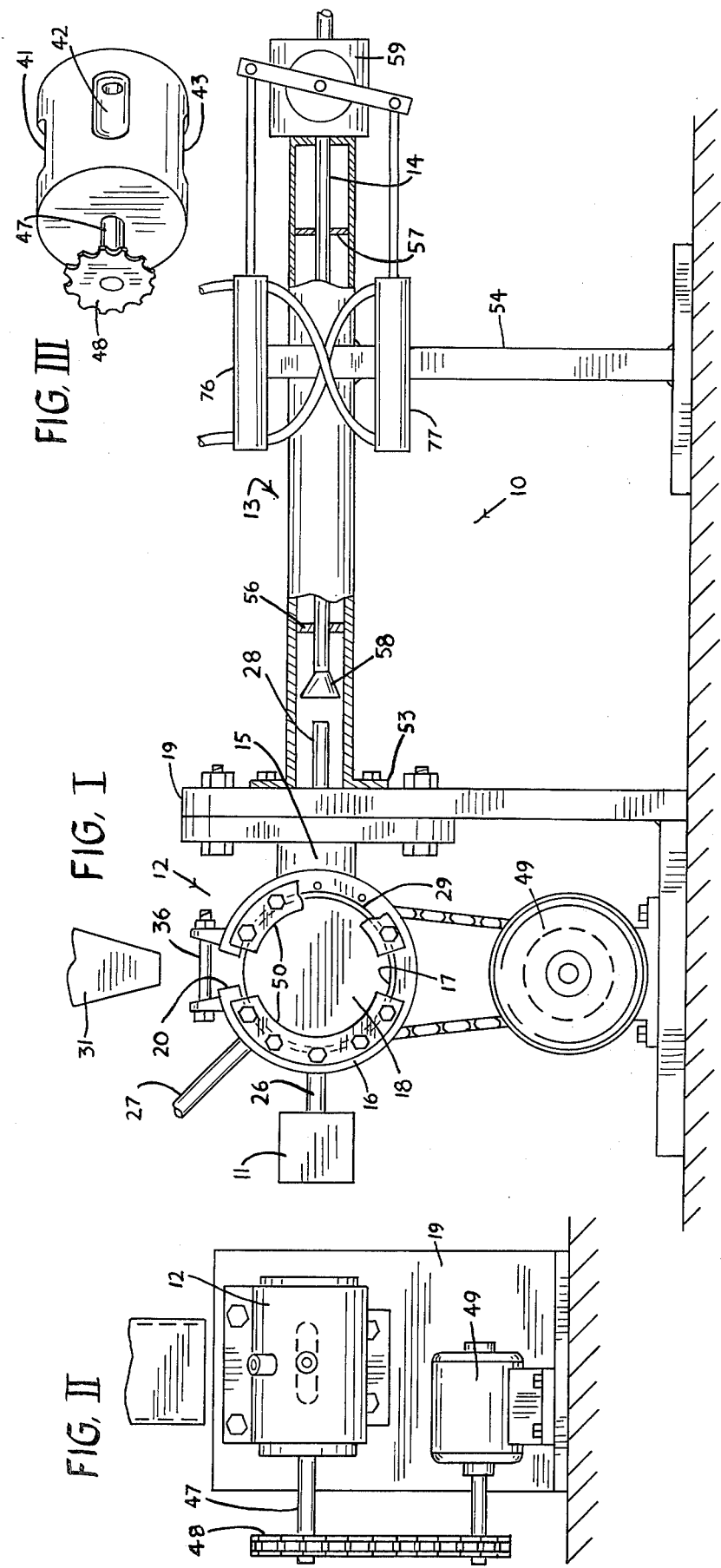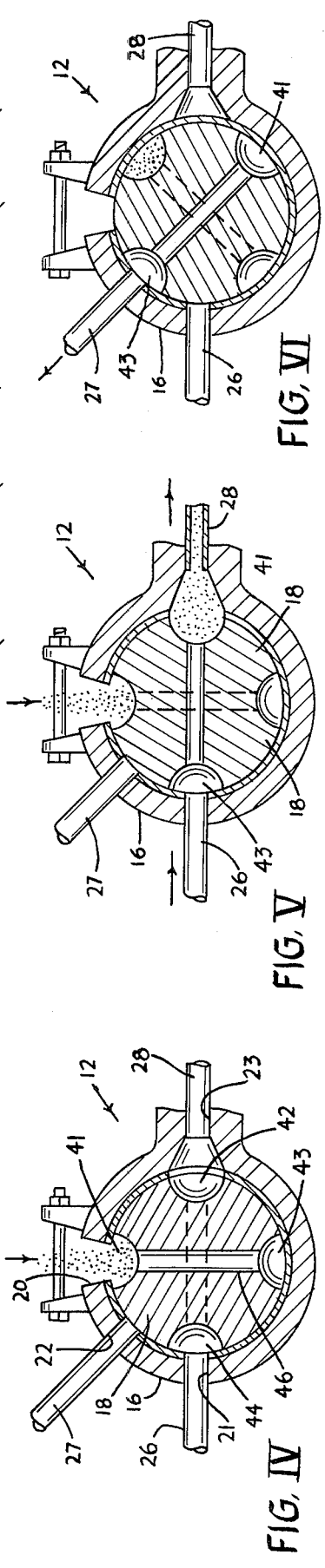

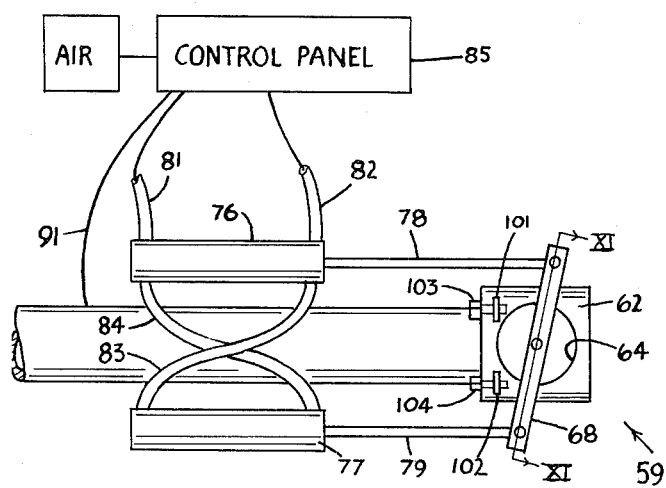
FIG. VII
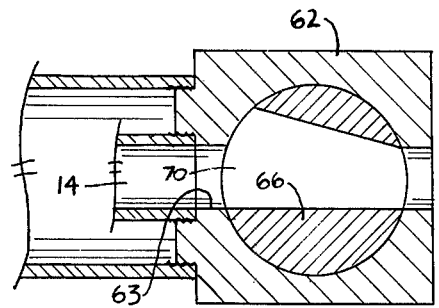
FIG. VIII
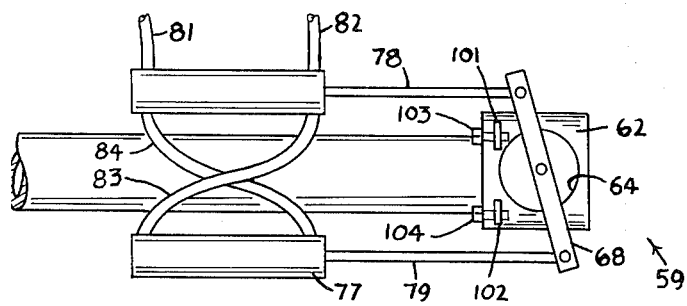
FIG. IX
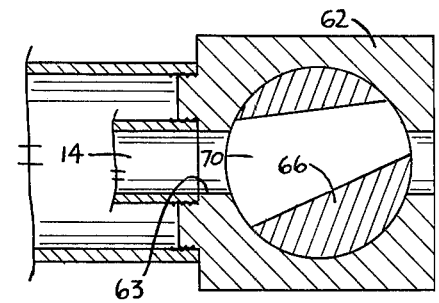
FIG. X
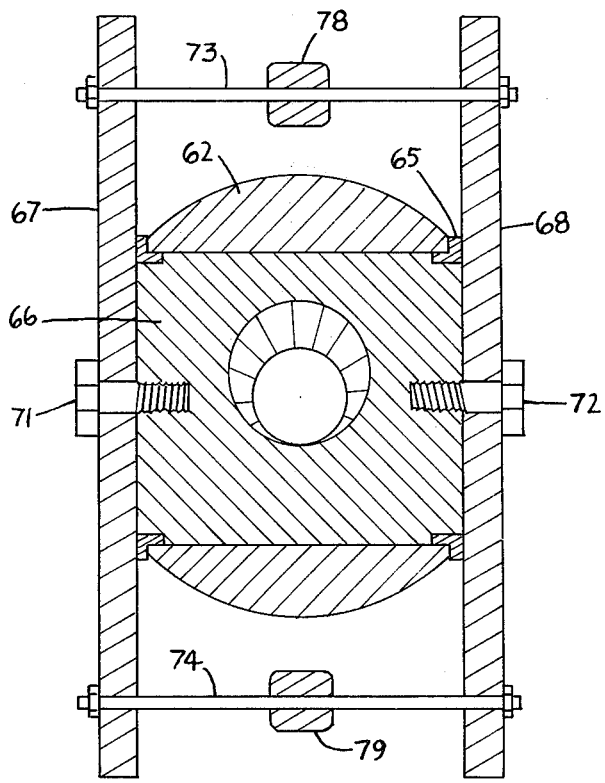
FIG. XI

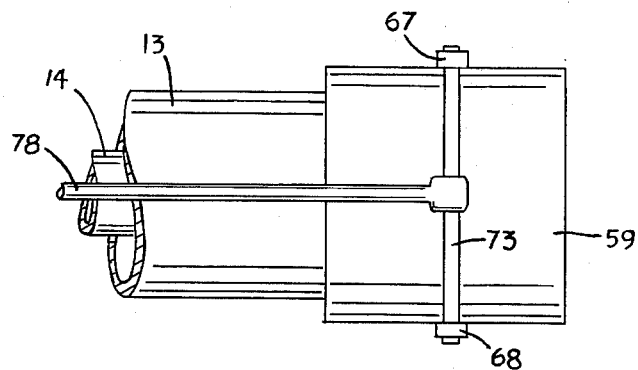
FIG. XII
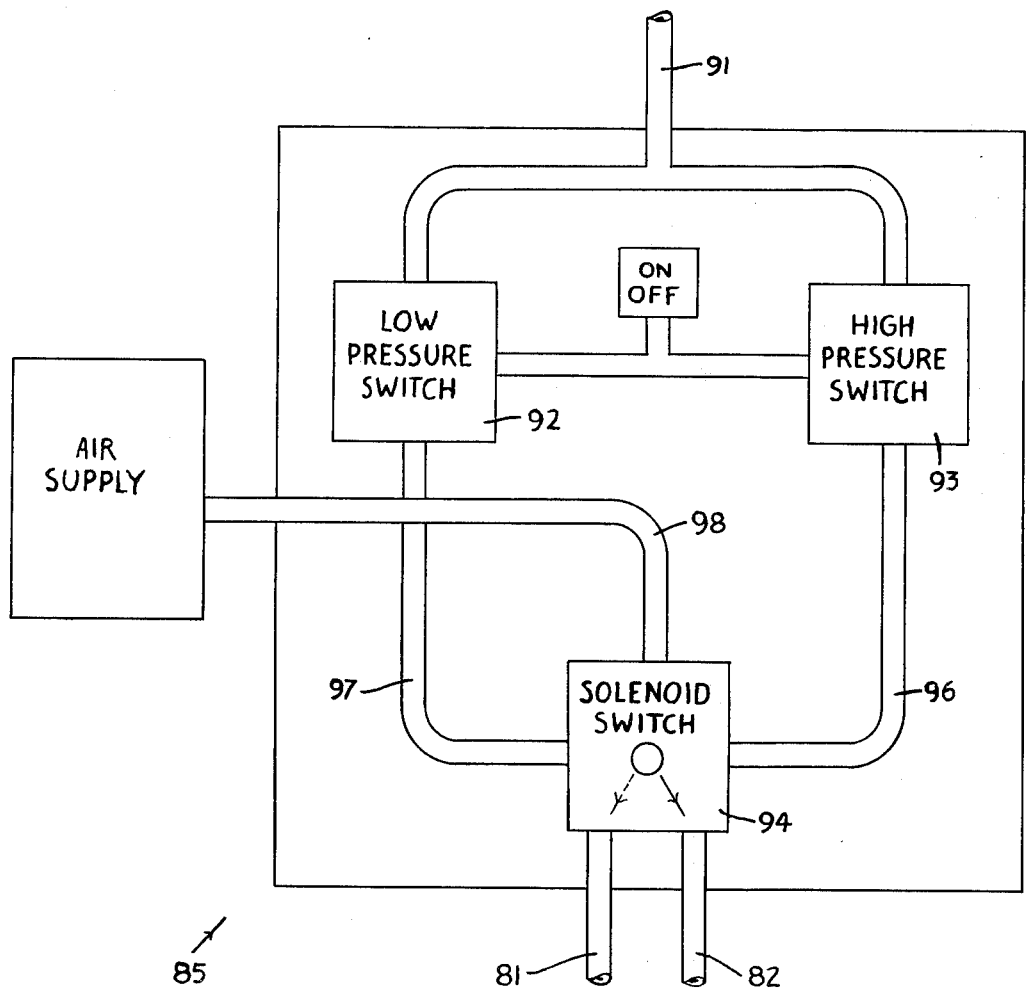
FIG. XIII

APPARATUS FOR TEXTURING PROTEIN

BACKGROUND OF THE PRESENT INVENTION

The present invention relates to treating of food products and more particularly to texturizing fine particulate protein food products.

In recent years substantial effort has been directed toward treating vegetable protein materials so as to provide such materials with texture and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals, typically including at least about 50% protein by weight.

Various types of methods and apparatus have been used in the past to texturize the vegetable protein material. For example, solubilized soy protein has been extruded into an acid bath thereby forming texturized fibers. Untexturized protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into continuous phase protein and expanding or puffing the protein material to produce at least some cellular structure. Such material has a chewiness or bite characteristic similar to meat.

It was recently discovered that finely-divided particulate protein material may be texturized by passing the material through an elongated cylinder or pipe and applying elevated pressure and temperature. The cylinder included a fixed orifice. (See U.S. Pat. No. 3,754,926) Although this recently discovered method provides highly satisfactory texturized protein, certain problems were confronted during sustained operation. For example, at times pieces of texturized protein were produced that plugged or blocked the apparatus thus necessitating shutting down operation and disassembling of the apparatus to remove the protein piece. The present invention provides improved apparatus that overcomes such problems. The present apparatus is simple in structure and is very durable. Moreover, the present invention permits increase in processing rates by as much as 50% or more over apparatus using a fixed orifice. The present invention also permits much smoother operation of the texturizing process.

The protein material to be processed according to the present invention may be of the type used in previous texturizing processes. This typically includes the various defatted oil seed meals and flours such as soybean, peanut, cottonseed and sesame. Various other untextured protein materials such as wheat gluten, yeast, sodium caseinate and the like may be texturized according to the present invention. The protein material used in the present invention is preferably a flour-like material, particularly soybean.

THE PRESENT INVENTION

Apparatus according to the present invention is shown in the drawings as follows:

FIG. 1 shows a side view of the apparatus with portions broken away;

FIG. II shows an end view of the apparatus;

FIG. III shows a portion of a valve of the apparatus;

FIGS. IV–VI show cross sectional view of the valve in various positions of operation;

FIG. VII shows a nozzle of the present invention in the open position;

FIG. VIII is a cross-sectional view of the nozzle of FIG. VII;

FIG. IX shows the nozzle of FIG. VII in a restricted position;

FIG. X is a sectional view of the nozzle in the position illustrated in FIG. IX;

FIG. XI shows a cross-sectional view of the nozzle taken along the line XI—XI in FIG. VII; and FIG. XII shows a top view of the nozzle.

The texturizing apparatus 10 (FIG. I) may include a rotary valve 12, a pressure tank 13 and a tube 14. The texturizing apparatus 10 is connected to a high pressure fluid source 11 such as a steam boiler which is capable of providing a fluid or steam pressure to the rotary valve 12 sufficient to texturize the protein material.

The rotary valve 12 includes a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be texturized. The housing 16 (FIG. IV) further includes openings 21, 22 and 23 for reception of pipes 26, 27 and 28, respectively. The pipes, for example, may be threaddedly engaged in said openings. The pipe 26 is connected to the steam source 11 and feeds the pressurized steam to the valve 12. Pipe 27 is an exhaust pipe which depressurizes any residual steam pressure in valve 12 prior to the feeding of protein material to the valve 12 through opening 20. Pipe 28 is the outlet through which protein material leaves valve 12. A hopper 31 (FIG. I) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. III–VI) may be of steel and may be machined from a solid cylinder or alternatively it may be formed by casting. The member 18 is provided with any desired number of material conveying pockets such as 41, 42, 43 and 44. The member 18 will normally have an even number of such pockets, typically four, six, eight or ten. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. I). The valve member 18 may be held in position in housing 16 by restraining plates, such as plate 50 which is secured to housing 16 by screws.

The pressure tank or surge tank 13 and the tube 14 in the embodiment shown in FIG. I may be concentric pipes. The pressure tank 13 may be secured to the support bracket 19 by flange 53. The pressure tank 13 may be further supported by one or more legs such as leg 54. The tube 14 is mounted in pressure tank 13 such as by spider flanges 56 and 57. The pressure tank 13 is sealed from the atmosphere except through tube 14. If desired, a portion 58 of tube 14 nearest to valve 12 may be flared radially outwardly for ready reception of the protein material from pipe 28. Space is provided between the outermost edge of flared portion 58 and the adjacent wall of pressure tank 13 so that the pressure may equalize throughout tank 13.

The tube 14 has a nozzle 59 which limits the escape of pressure from the texturizing apparatus 10 thereby providing a build up of pressure in tank 13.

The nozzle 59 of the present invention is shown in detail in FIGS. VII–XIII. The nozzle 59 (FIGS. VII and VIII) has a body portion 62, which may be cylindrically shaped, having an opening therethrough which is aligned with the opening through tube 14. The body portion 62 may be constructed from solid metal cylinder stock by drilling the opening 63 therethrough. The opening 63 may be of any suitable diameter, for example, the same internal diameter as pipe 14. The body portion 62 further includes an opening 64 which extends therethrough in a transverse direction. In other words, opening 64 intersects opening 63. The opening 64 is somewhat larger in diameter than opening 63.

The nozzle 59 further includes a plug 66 which is rotatably mounted in opening 64. The plug 66 may be constructed of cylindrical metal stock and is of substantially the same diameter as the opening 64, thereby snugly fitting into opening 64. The plug 66 has an opening 70 therethrough which may be aligned with opening 63 as shown in FIG. VIII to provide substantially full opening through the nozzle. The plug 66 may be rotated to a position of misalignment as shown in FIG. X to provide a restricted opening. The opening 70 may be frusto-conically shaped, or in other words the opening tapers inwardly as it progresses forwardly. Suitable seals 65 may be provided between the plug 66 and the body portion 62, as shown in FIG. XI. The plug 66 has a pair of straps 67 and 68 mounted at either end thereof for purposes hereinafter described. The straps 67 and 68 may be secured in locked engagement with plug 66, such as by screws 71 and 72, respectively. A pair of rods 73, 74 may interconnect the straps 67, 68 adjacent the ends thereof. The rods 73 and 74 may be suitably secured in place such as by threaded nuts. The nozzle 59 may be mounted on pressure tank 13 and pipe 14 by threaded engagement therewith as shown in FIG. VIII. The nozzle 59 may be provided with ears 101 and 102 each having a threaded opening through which screws 103 and 104 extend. The screws 103 and 104 are located in the rotational path of strap 68 and provide for limiting the arc through which the plug 66 rotates.

Texturizing apparatus 10 (FIG. VII) further includes a pair of pneumatic cylinders 76 and 77 which may be of conventional design. The pneumatic cylinders 76 and 77 may be supported by the leg 54. The pneumatic cylinder 76 has a push/pull rod 78 which is drivingly engaged with rod 73. The pneumatic cylinder 77 has a push/pull rod 79 which is drivingly engaged with rod 74. Alternatively, the plug 66 may be provided with a single strap, such as 67, and the push/pull rods 78 and 79 may be drivingly connected directly to the single strap. The pneumatic cylinder 76 includes a pair of air supply lines 81 and 82 which extend to the control panel 85. The pneumatic cylinder 76 is coupled with pneumatic cylinder 77 by air lines 83 and 84. The air line 83 connects the forward end of pneumatic cylinder 76 with the rearward end of pneumatic cylinder 77 as shown in FIG. VII. The air line 84 connects the rearward end of pneumatic cylinder 76 with the forward end of pneumatic cylinder 77.

The control panel 85 is capable of recognizing pressure changes in the tank 13. The tank 13 is interconnected to the control panel 85 by the air line 91, which extends to the low pressure switch 92 and the high pressure switch 93. The high pressure switch 93 communicates with the solenoid switch 94 through line 96. The low pressure switch 92 communicates with the solenoid switch 94 through line 97. The solenoid switch 94 provides communication between the air supply line 98 and the lines 81 and 82.

OPERATION OF THE PRESENT INVENTION

The protein material may be added to the texturizing apparatus 10 such as through the hopper 31. If desired, suitable provision may be made for metering or controlling the amount of feed material passing through the hopper 31. The feed material leaving hopper 31 falls through the opening 20 and the housing 16 of valve 12 thus being deposited, for example, in pocket 41 as shown in FIG. IV. The valve member 18 may rotate in a clockwise direction such that pocket 41 aligns with pipe 28 and pocket 43 aligns with pipe 26 in FIG. V. At that point the residual pressure in tank 13 and the pressure in pipe 26 act on the protein material. The pressure exerted on the protein material is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure may be as high as 140 p.s.i.g., or higher. The pressure exerted through pipe 26 by the fluid source 11 should be enough greater than the pressure exerted by the tank 13 that the protein material is rapidly forced through pipe 28, tube or chamber 14 and nozzle 59. The fluid provided by source 11 may be a fluid with a high heat transfer coefficient such as steam or a mixture of such fluid with other gaseous fluid, for example, a mixture of steam and air.

It is postulated that development of the continuous protein phase takes place immediately upon application of the pressure to the protein material by force from both the steam pipe 26 and the surge tank 13. In any event, the protein material is texturized upon leaving the nozzle 59. The steam continues to pass through valve 12 and pipe 28 for an instant following expulsion of the protein material from the pipe 28. This raises the pressure of tank 13. Of course, some pressure is lost through the tube 14 and nozzle 59 for an instant following expulsion of the pieces of protein from nozzle 59. However, the proper pressure may be maintained in tank 13 because of the controlled orifice size in nozzle 59. It has been found that the protein material fails to texturize appreciably if the back pressure from the pressure tank 13 is reduced below 15 p.s.i.g. The valve member 18 continues to rotate, pocket 43 aligns with exhaust pipe 27 and residual pressure in pockets 41, 43 and passageway 46, is relieved. Pocket 43 then reaches the feed port and is loaded with material to be texturized. The operational process then continues as described with respect to texturization using the pocket 41. Texturization takes place using pockets 42 and 44 substantially as described with respect to pockets 41 and 43. The valve member 18 may be rotated at any desired speed depending upon such things as the size of the pockets, the number of pockets and the feed rate of protein material.

Operation of nozzle 59 is illustrated in FIGS. VII–XIII. During normal operation, pneumatic cylinders 76 and 77 urge the rotatable plug 66 toward the restricted position illustrated in FIGS. IX and X. The protein material being texturized passes through tube 14, the opening 70 in plug 66 and out of the nozzle 59. Occasionally a large piece of texturized protein is formed which enters the nozzle and momentarily blocks at least a portion of the orifice provided between the opening in plug 66 and the body portion 62. Steam pressure then builds up until the high pressure switch 93 is activated which switches the solenoid to line 81 thereby activating pneumatic cylinders 76 and 77 to open the nozzle as shown in FIGS. VII and VIII. Once the large piece of protein has been expelled from the nozzle 59, pressure in the system drops and the low pressure switch 92 is activated thereby switching the solenoid from line 81 to line 82 thereby reversing the pneumatic cylinder 76 and 77 to restrict the opening in the nozzle as shown in FIGS. IX and X.

The rotation of plug 66 toward the closed or restricted position of FIGS. IX and X is limited by contact of strap 68 with screw 103. The nozzle will rarely if ever be completely closed but may be provided with a predetermined limited opening. The amount of such opening may be increased by turning screw 103 inwardly or decreased by turning screw 103 outwardly. The rotation of plug 66 toward the open position of FIGS. VII and VIII may be limited by contact of strap 68 with screw 104. The nozzle will normally be adjusted to permit full opening; however, screw 104 may be adjusted to provide less than full opening, if desired.

Although the present invention is disclosed in the form of a specific embodiment, it is to be recognized that various modifications may be made without departing from the scope of the present invention as defined in the claims. For example, the rotary valve may be modified as shown in U.S. Pat. application Ser. No. 391,431 filed Aug. 24, 1973. The treating chamber may be modified as shown in U.S. Pat. application Ser. No. 406,744 filed Oct. 15, 1973. Various other modifications may be made as desired.

The present invention may be used in texturizing various materials and using various operating conditions. The untextured protein may be a vegetable protein, such as soybean protein, a protist protein, such as yeast and other miccrobials, or animal protein, such as casein. The untextured feed material may be a typical defatted oilseed flour such as soybean flour. The feed material may be a concentrate such as soybean concentrate, or isolate such as a soybean isolate. A material having a protein content as low as 30% (dry weight basis) and as high as 95% may be satisfactorily texturized according to the present invention. For most uses of textured protein contemplated by the present invention, the protein content will be at least 50%, preferably about 55 to 75%. The term "percent" as used herein means percent by weight (as is moisture content) unless otherwise specified.

Protein material having a moisture content as low as 4 to 6% and as high as 40% by weight, may be texturized according to the present invention. Materials having moisture contents above 40% may be texturized according to the present invention; however, they tend to become sticky or difficult to handle.

The textured protein of the present invention may be used for the same purposes and in substantially the same manner as previously known types of texturized protein. The protein material as it comes from the texturizing apparatus may be impregnated with conventional meat analog serum typically including binder, flavoring and water, thereby providing a simulated beef chunk or a simulated chicken chunk. Alternatively, the textured protein may be ground such as with a Commitrol cutter, hydrated and mixed with ground beef or pork sausage, thus acting as a meat extender.

The embodiments of the invention in which an exclusive property or privilege is claimed are defined as follows:

1. In an apparatus for texturizing particulate protein material having elongated cylinder means, including inlet feeding means adjacent a first end of said cylinder means and outlet means adjacent the other end of said cylinder means; means for maintaining a fluid pressure in said cylinder means; and means for applying a steam flow force to the protein material in said inlet feeding means to force the protein material through said elongated pressurized cylinder means and out of said outlet means; the improvement comprising:
   nozzle means defining an adjustable orifice in said outlet means, said nozzle means including:
   body means having a first opening extending therethrough which is aligned with said cylinder means and a second opening which intersects said first opening;
   rotatable plug means disposed in said second opening, said plug means having an opening extending therethrough which may be aligned and misaligned with the first opening in said body means, said plug means opening being frusto-conically shaped having an enlarged upstream end and smaller downstream end;
   driving means for rotatably driving said plug means; and
   limit means to limit the rotation of said plug means such that said upstream end maintains full communication with the first opening in said body means upstream of said plug and said downstream end moves from full communication to limited communication with the first opening in said body means downstream of said plug means;
   whereby said plug means is rotatable to provide substantially full opening through said nozzle means and rotatable to provide limited opening through said nozzle means.

2. In the apparatus of claim 1 wherein said plug means is rotatably driven by pneumatic cylinder means.

3. In the apparatus of claim 2 wherein said apparatus includes sensing means for monitoring the pressure in said cylinder means and actuating means to rotate said plug means to adjust the amount of opening through said nozzle in accordance with said sensed pressure.

4. In the apparatus of claim 1 wherein said limiting means are adjustable.

* * * * *